Aug. 26, 1924.                                          1,506,557
                        W. BIRD
              ANTIVIBRATION SUSPENSION DEVICE
              Filed April 19, 1922      3 Sheets-Sheet 1

Inventor
William Bird
per Herbert Peck
              Att'y.

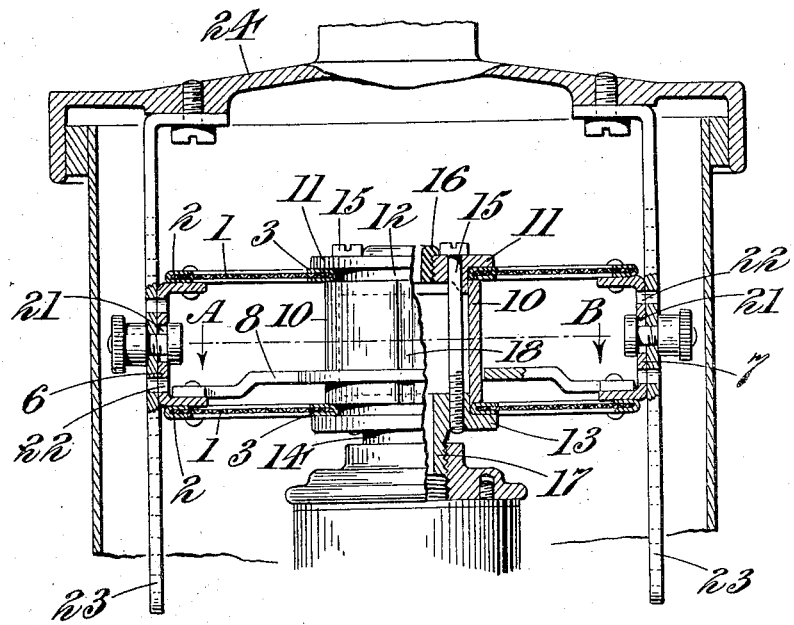
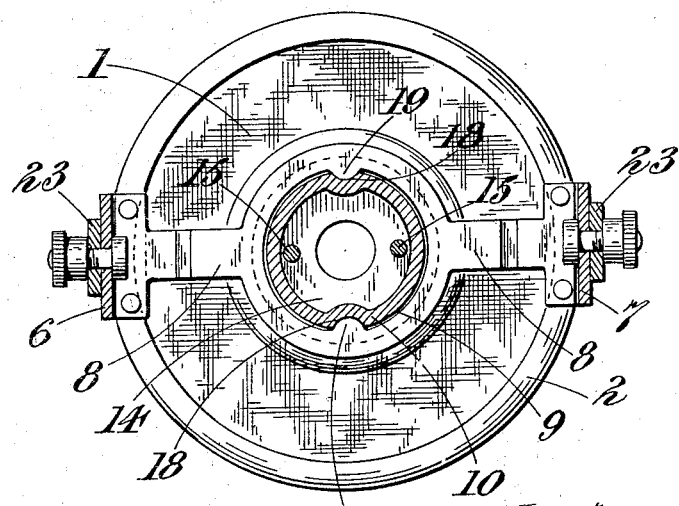

Aug. 26, 1924.

W. BIRD 1,506,557

ANTIVIBRATION SUSPENSION DEVICE

Filed April 19, 1922   3 Sheets-Sheet 3

Inventor
William Bird
per Hubert Peck Atty.

Patented Aug. 26, 1924.

1,506,557

UNITED STATES PATENT OFFICE.

WILLIAM BIRD, OF ST. ALBANS, ENGLAND.

ANTIVIBRATION SUSPENSION DEVICE.

Application filed April 19, 1922. Serial No. 555,649.

*To all whom it may concern:*

Be it known that I, WILLIAM BIRD, a subject of the King of Great Britain and Ireland, and resident of St. Albans, in the county of Hertford, England, have invented new and useful Improvements in or Relating to Antivibration Suspension Devices, of which the following is a specification.

This invention relates to anti-vibration suspension devices and it has for its object improvements by which certain advantages shall be obtained.

The invention relates to an anti-vibration suspension device of the kind in which the supported member is connected to the supporting member by a flexible or resilient member comprising woven or braided material such as wire gauze.

According to the present invention, in an anti-vibration suspension of the kind described, the flexible or resilient member comprises woven or braided material, such as wire gauze, having cuts or lines of holes, either straight or curved, transverse to the dimension between the supporting and the supported members.

The flexible or resilient member may be in the form of a ring or annulus with the cuts or lines of holes transverse to its radii, or may be of cylindrical or truncated cone form connected at one part to the supporting member and at another part to the supported member.

A further feature of this invention comprises means to prevent a rotary motion of the supported member in relation to the supporting member, such for example, as a member attached to the supporting member and engaging longitudinal slots or grooves in the supported member. Preferably, said means also only allows a limited longitudinal movement of the supported member in relation to the supporting member.

The present invention is particularly applicable to electric light fittings, but it is to be understood that the invention is not so limited and that it may be applied to any apparatus which is to be suspended or supported in an anti-vibrational manner.

Forms of the present invention will now be described with reference to the accompanying drawings in which there is also illustrated the application of the invention to an electric light fitting.

Figs. 1 and 2 show a disc or annulus form of resilient member;

Fig. 3 a cylindrical form;

Fig. 5 shows a sectional elevation of the application of the invention to an electric light fitting, and Fig. 6 a plan in section on the line A—B of Fig. 5.

Figure 1:
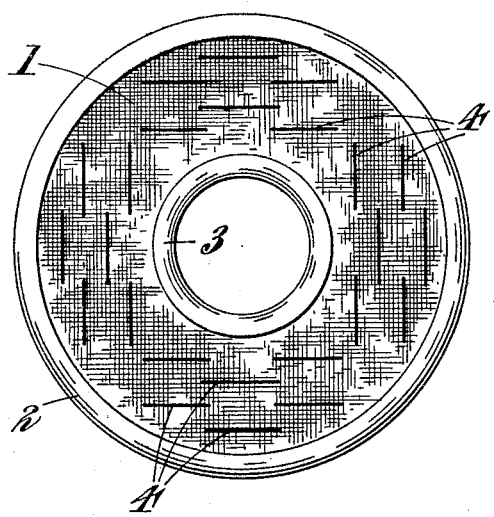

Referring to Fig. 1, 1 is an annulus of wire gauze mounted in an outer metal ring 2 and an inner metal ring 3. The gauze has a plurality of cuts 4 which are transverse to the radii of the annulus and which are staggered in relation to each other, and, in the example, are of such length that no complete strand of the gauze connects the outer and inner rings 2 and 3. The cuts in this example are in substantially 4 lines at right angles to each other.

Figure 2:
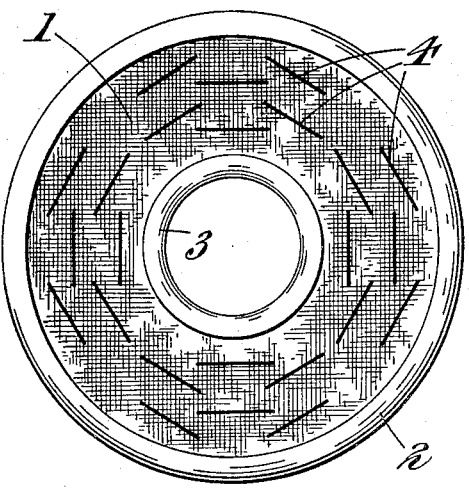

In Fig. 2, the cuts 4 are not in parallel lines but are inclined to each other.

Figure 3:
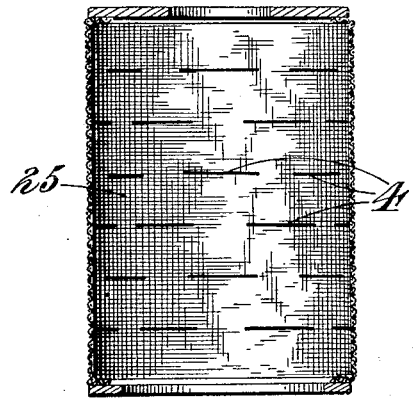
Figure 4:
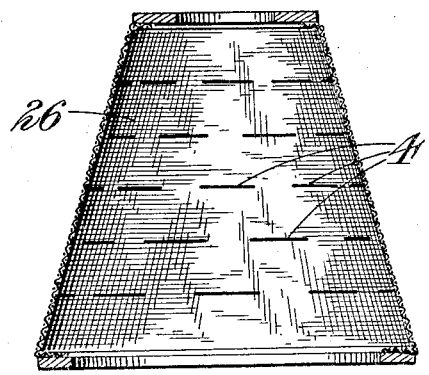
Fig. 4 shows a truncated cone form.

In Fig. 3 the resilient member is in the form of a cylinder 25, and in Fig. 4 in the form of a truncated cone 26. The resilient member may be connected at one end to the supporting member and at the other end to the supported member or the two ends may be joined together and connected to the one member and the body of the gauze connected to the other member, for example, by a carrying ring mounted thereon.

Referring to Figs. 5 and 6, a pair of discs 1, 1 for example, of the form illustrated in Figs. 1 or 2 are connected together at opposite ends of a diameter by channel members 6, 7 secured by rivets or screws. These members are connected by a transverse member 8 having a circular hole 9, the centre of which lies in the axis of the discs.

The inner ring of the top disc is secured between a cylindrical member 10 and the shoulder 11 of a ring-shaped top casting 12, and the lower disc is secured between the opposite end of the cylindrical member 10 and the shoulder 13 of a ring-shaped bottom casting 14; the top ring-shaped casting 12 is secured to the bottom ring-shaped casting 14 by screws 15, 15. An insulating bush 16 is secured in the ring-shaped castings.

The bottom casting 14 has a screwed nipple 17 on to which is screwed a lamp holder of usual construction. The cylindrical member 10, which constitutes part of the supported member, is provided with two oppositely arranged longitudinal grooves 18, 18 with which engage projections 19, 19 on the transverse member 8.

The projections 19, 19 and the grooves 18, 18 in the cylindrical member 10 prevent any angular strain being imparted to the gauze in the discs 1, 1, when the lamp is inserted in or removed from the lamp holder. Similarly, the transverse member 8 prevents undue relative longitudinal movement between the inner circumference and the outer circumference of the discs when inserting a lamp in or removing it from the lamp holder.

The channel members 6, 7 are provided with slots 21 and holes 22 by which they are attached to hangers or brackets 23 supported in the fitting or lamp body 24.

If the fitting be subjected to vibration the shocks are taken up by the resilient member and not transmitted to the supported member.

Figure 7:
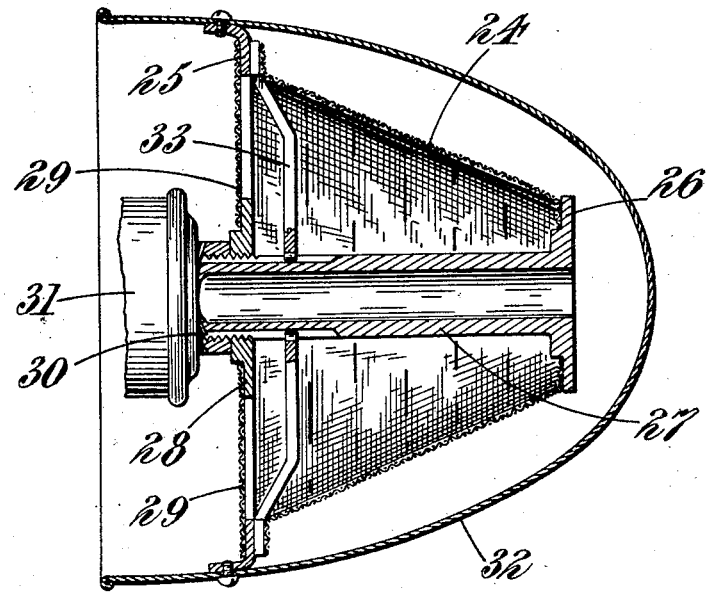
Fig. 7 shows a sectional elevation of a modification of the invention employed for a horizontal electric light fitting such, for example, as might be used in a motor car head lamp.

Referring to Fig. 7 a tubular resilient member 24 of conical form is secured at one end to a ring 25 and at the other end to a shoulder 26 of a cylindrical member 27. The ring 25 is also connected to a shoulder 28 at the opposite end of the cylindrical member 27 by a resilient member 29 of ring form. The cylindrical member 27 has a screwed nipple 30 for the attachment of the lamp fitting 31. The ring 25 is bent up so that it may be secured to a supporting member such as a lamp housing 32 as by rivets or being screwed thereto. A transverse member 33 secured at its opposite ends to the ring 25 and having a central hole, the centre of which lies in the axis of the cylindrical member 27 is provided with two oppositely arranged projections which engage longitudinal grooves in the cylindrical member 27. These projections and grooves prevent any angular strain being imparted to the gauze of the members 24 and 29 when the lamp is inserted in or removed from the lamp holder. The member 24 has cuts which are transverse to the direction from the lamp housing 32 which constitutes the supporting member, to the cylindrical member 27 which constitutes the supported member; similarly, the member 29 has cuts which are transverse to the direction from the lamp housing 32 to the cylindrical member 27.

It is to be understood that various methods of attaching the anti-vibration suspension device in a lamp fitting may be employed without departing from this invention and further that in certain cases a flexible or resilient member may be mounted in a lamp or other fitting without the employment of the outer and inner rings 2 and 3 permanently attached to the gauze. Thus, it may be secured by removable rings screwed to the lamp or other fitting and to the supported member.

According to a modification of the invention, the cuts or lines of holes may be formed at the edges of the flexible or resilient member, or portions of its edges may be cut away, so that it is attached to the supporting and supported members at portions of its edges, which portions at the opposite edges are staggered in relation to each other: additional cuts or piercings may also be made in the body of the flexible or resilient member.

It is found in practice to be preferable to arrange that each strand of the woven or braided material connecting the supporting and supported members is severed at two points.

It is to be understood that the invention is not limited to the use of the anti-vibration suspension with its axis vertical, but it may be used with its axis in any other position, such as horizontal.

What I claim is:—

1. An anti-vibration suspension comprising a supporting member, a supported member, and a resilient member of woven material extending between the supporting and the supported members, said resilient member having cuts therethrough transverse to the direction of those strands of the woven material extending between the supporting and the supported members, the respective ends of said cuts overlapping so that no complete strand connects the supported and supporting members.

2. An anti-vibration suspension comprising a supporting member, a supported member, a resilient member of woven material extending between the supporting and supported members and having cuts transverse to the direction of those strands of the woven material extending between the supporting and supported members with the respective ends of said cuts overlapping so that no complete strand connects said members, and means to prevent radial motion of the supported member with respect to the supporting member in all relative positions of the supported and supporting members.

3. An anti-vibration suspension comprising a supporting member, a supported member, and a resilient member of woven material extending between the supporting and supported members, the resilient member having cuts at the edges thereof transverse to the direction of the weave extending between the supporting and supported members so arranged that no continuous element of the weave connects said members.

4. An anti-vibration suspension comprising a supporting member, a supported member, and a resilient member comprising a disc and a tubular member connected at one end to said disc, both said disc and said tubular member formed of woven material extending between the supporting and supported members and both having cuts transverse to the direction of the weave extending between the supporting and the supported members with the cuts so arranged that no continuous element of the weave connects the said members, respectively.

5. An anti-vibration suspension comprising a first member, a disc of wire gauze connected thereto, a tubular member of wire gauze connected at one end to said first member, a second member connected to the other end of the tubular member and to the disc, the disc and the tubular member having cuts transverse to the direction between the first and second members, and one of said members having means for mounting the supported member thereon.

6. An anti-vibration suspension comprising a first member, a disc of wire gauze connected thereto, a tubular member of wire gauze connected at one end to said first member, a second member connected to the other end of the tubular member and to the disc, the disc and the tubular member having cuts transverse to the direction between the first and second members, one of said members having means for mounting the supported member thereon, and means to prevent radial motion of the first member with respect to the second member, comprising a third member attached to one of the members and engaging longitudinal grooves in the other member.

7. An anti-vibration suspension comprising a resilient member of woven material adapted to be attached at one part to a supporting member and at another to a supported member, the resilient member having cuts transverse to the direction between the points of attachment to the supporting and supported members with the respective ends of the cuts in overlapping relation so that no complete strand of the woven material connects said members.

8. An anti-vibration suspension comprising a supporting member, a supported member, and a resilient member of woven material extending between the supporting and the supported member, the resilient member having a series of cuts therethrough transverse to the direction of the weave extending between the supporting and supported members and so arranged that no complete strand of the woven material connects said supporting and supported members.

9. In an anti-vibration suspension including a supporting member, and a supported member, a resilient member composed of a single sheet of woven material extending between and connecting the supporting and supported members, the said woven material provided with a series of cuts therethrough transverse to those strands of the woven material extending between the supporting and supported members and so arranged in staggered relation with respect to each other, whereby no complete strand connects the said members.

10. In an anti-vibration suspension including a supporting member and a supported member, a resilient member composed of a single sheet of woven material extending between and connecting the supported member with the supporting member, said woven material provided with a series of cuts therethrough transverse to those strands of the woven material extending between the supporting and supported members, and said cuts spaced apart and staggered in relation to each other with the ends of each cut overlapping the ends of adjacent cuts, respectively, whereby no complete strand connects the said members.

Dated this third day of April, 1922.

WILLIAM BIRD.